US010425582B2

(12) United States Patent
Kopf (10) Patent No.: US 10,425,582 B2
(45) Date of Patent: Sep. 24, 2019

(54) VIDEO STABILIZATION SYSTEM FOR 360-DEGREE VIDEO DATA

(71) Applicant: Facebook, Inc., Menlo Park, CA (US)

(72) Inventor: Johannes Peter Kopf, Seattle, WA (US)

(73) Assignee: Facebook, Inc., Menlo Park, CA (US)

(*) Notice: Subject to any disclaimer, the term of this patent is extended or adjusted under 35 U.S.C. 154(b) by 148 days.

(21) Appl. No.: 15/247,834

(22) Filed: Aug. 25, 2016

(65) Prior Publication Data

US 2018/0063440 A1 Mar. 1, 2018

(51) Int. Cl.
| H04N 7/00 | (2011.01) |
| H04N 5/232 | (2006.01) |
| G06T 5/00 | (2006.01) |
| G06T 5/50 | (2006.01) |
| G06T 7/246 | (2017.01) |

(52) U.S. Cl.
CPC ......... *H04N 5/23267* (2013.01); *G06T 5/002* (2013.01); *G06T 5/50* (2013.01); *G06T 7/246* (2017.01); *H04N 5/23238* (2013.01); *G06T 2207/10016* (2013.01)

(58) Field of Classification Search
CPC ................................................. H04N 5/23257
See application file for complete search history.

(56) References Cited

U.S. PATENT DOCUMENTS

| 2003/0090593 A1* | 5/2003 | Xiong | H04N 5/23248 348/620 |
| 2007/0031062 A1* | 2/2007 | Pal | G06K 9/32 382/284 |
| 2007/0172151 A1* | 7/2007 | Gennetten | H04N 5/232 382/299 |

OTHER PUBLICATIONS

Shuaicheng Liu, Bundled Camera Paths for Video Stabilization by National University of Singapore, Publication Date: Jul. 2013, vol. 32.*
Shuaicheng Liu, Bundled Camera Paths for Video Stabilization by National University of Singapore, Publication Date: Jul. 2013, vol. 32 (Year: 2013).*
Baker, S. et al., "Removing Rolling Shutter Wobble," Computer Vision and Pattern Recognition, Mar. 2010, pp. 2392-2399.
Bhat, P. et al., "Using Photographs to Enhance Videos of a Static Scene," Proceedings of the 18th Eurographics Conference on Rendering Techniques, 2007, pp. 327-338.

(Continued)

*Primary Examiner* — Md N Haque
(74) *Attorney, Agent, or Firm* — Fenwick & West LLP (57) ABSTRACT

An image processing system generates 360-degree stabilized videos with higher robustness, speed, and smoothing ability using a hybrid 3D-2D stabilization model. The image processing system first receives an input video data (e.g., a 360-degree video data) for rotation stabilization. After tracking feature points through the input video data, the image processing system determines key frames and estimates rotations of key frames using a 3D reasoning based on the tracked feature points. The image processing system also optimizes inner frames between key frames using a 2D analysis based on the estimated key frame rotation. After the 3D reasoning and the 2D analysis, the image processing system may reapply a smoothed version of raw rotations to preserve desirable rotations included in the original input video data, and generates a stabilized version of the input video data (e.g., a 360-degree stabilized video).

18 Claims, 7 Drawing Sheets

(56) References Cited

OTHER PUBLICATIONS

Bouguet, J., "Pyramidal Implementation of the Lucas Kanade Feature Tracker Description of the Algorithm," Intel Corporation, Microprocessor Research Labs, 2000, nine pages.

Buehler, C. et al., "Non-Metric Image-Based Rendering for Video Stabilization," IEEE Conference on Computer Vision and Pattern Recognition, 2001, pp. II-609-II-614.

Fischler, M. et al., "Random Sample Consensus: A Paradigm for Model Fitting with Applications to Image Analysis and Automated Cartography," Communications of the ACM, vol. 24, No. 6, Jun. 1981, pp. 381-395.

Goldstein, A. et al., "Video Stabilization Using Epipolar Geometry," ACM Transactions on Graphics, vol. 31, No. 5, Article 126, Aug. 2012, pp. 126:1-126:10.

Grundmann, M. et al., "Auto-Directed Video Stabilization with Robust L1 Optimal Camera Paths," IEEE Conference on Computer Vision and Pattern Recognition, 2011, pp. 225-232.

Kasahara, S. et al., "First Person Omnidirectional Video: System Design and Implications for Immersive Experience," TVX 2015, pp. 33-42.

Kennedy, R. et al., "Research in Visually Induced Motion Sickness," Applied Ergonomics, vol. 41, Issue 4, Jul. 2010, pp. 494-503.

Kneip, L. et al., "OpenGV: A Unified and Generalized Approach to Real-Time Calibrated Geometric Vision," IEEE International Conference on Robotics & Automation, 2014, eight pages.

Kopf, J. et al., "First-Person Hyper-Lapse Videos," ACM Transactions on Graphics, vol. 33, No. 4, Article 78, Jul. 2014, pp. 78:1-78:10.

Langer, T. et al., "Spherical Barycentric Coordinates," Proceedings of the Fourth Eurographics Symposium on Geometry Processing, 2006, nine pages.

Liu, F. et al., "Content-Preserving Warps for 3D Video Stabilization," ACM Transactions on Graphics, vol. 28, No. 3, Article 44, Aug. 2009, pp. 44:1-44:9.

Liu, F. et al., "Subspace Video Stabilization," ACM Transactions on Graphics, vol. 30, No. 1, Article 4, Jan. 2011, pp. 4:1-4:10.

Liu, S. et al., "Bundled Camera Paths for Video Stabilization," ACM Transactions on Graphics, vol. 32, No. 4, Article 78, Jul. 2013, pp. 78:1-78:10.

Liu, S. et al., "SteadyFlow: Spatially Smooth Optical Flow for Video Stabilization," IEEE Conference on Computer Vision and Pattern Recognition, 2014, pp. 4209-4216.

Morimoto, C. et al., "Evaluation of Image Stabilization Algorithms," Proceedings of the IEEE International Conference on Acoustics, Speech and Signal Processing, 1998, pp. 2789-2792.

Nistér, D., "An Efficient Solution to the Five-Point Relative Pose Problem," IEEE Transactions on Pattern Analysis and Machine Intelligence, vol. 26, No. 6, Jun. 2004, pp. 756-770.

Shi, J. et al., "Good Features to Track," IEEE Conference on Computer Vision and Pattern Recognition, 1994, pp. 593-600.

Yang, L. et al., "Image-Based Bidirectional Scene Reprojection," ACM Transactions on Graphics, vol. 30, No. 6, Article 150, Dec. 2011, pp. 150:1-150:10.

* cited by examiner

VIDEO STABILIZATION SYSTEM FOR 360-DEGREE VIDEO DATA

BACKGROUND

This disclosure relates generally to a vision system, and more specifically to an image processing system that stabilizes 360-degree video data.

Consumer-level 360-degree cameras are becoming increasingly popular and are often used in a variety of user devices to capture 360-degree images and/or videos, and 360-degree video systems generate a completely immersive experience that transports a user to another world in which a user can look in any direction in a scene. In one example, multiple cameras are used to in a Virtual Reality (VR) system to create 360-degree virtual scenes for a user to experience a virtual scene.

But problems may arise when recording and generating 360-degree video data. As one example, casual 360-degree video data taken with a hand-held camera often look shaky, and individual frames are geometrically distorted by rolling shutter wobble. Shake in 360-degree video data is particularly severe because it causes discomfort when watched using VR headsets. Furthermore, most existing video stabilization algorithms that resolve problems of shaky 360-degree video data are designed specifically for narrow field of view video and use two-dimensional (2D) motion models; however, many current 2D motion models do not translate easily to the spherical warp-around domain in 360-degree video data. Additionally, although some current algorithms reconstruct three dimensional (3D) models of camera trajectory and scene geometry to realize stabilized 360-degree video data, performing a full 3D reconstruction is a complex process, slow in practice, and not robust under certain situations, such as the absence of translation motion.

Therefore, there is a need for a new algorithm that enables 360-degree video data stabilization with higher robustness, speed, and smoothing ability.

SUMMARY

An image processing system realizes 360-degree video data stabilization using a hybrid 3D-2D stabilization model.

The image processing system applies the hybrid 3D-2D stabilization model to generate a 360-degree stabilized version of a raw video data (e.g., a 360-degree video data). As used herein, "360-degree video data" refers to a video shot with an omnidirectional camera, or stitched from a collection of multiple cameras, where each frame of the 360-degree video data shows a circumferential view that is larger than what would be visible from a single view direction (e.g., an entire circumferential scene, though may contain less than the full 360 possible degrees of image data). Using the 360-degree video data, a rendering system receives a view direction as input and generates a 2D projection or representation of the 360-degree video data as viewable from the camera location in the received view direction. Moreover, a "360-degree stabilized video" refers to a stabilized version of the raw 360-degree video data with undesirable rotations (e.g., high frequency jitter) removed.

To apply the hybrid 3D-2D stabilization model, the image processing system first receives an input video data of a scene for rotation stabilization. The image processing system determines a set of feature points and tracks motion of the set of feature points through all the video frames of the input video data, forming visual feature point trajectories. A "feature point," as used herein, refers to a representative point of the scene captured in one or more video frames that are used for tracking, and for example, for an input video data that captures a scene including a person, a feature point may be the center of the person's head captured by the input video data. The term "feature point trajectories" refers to accumulated trajectories of motion tracks of the feature points through a series of video frames of the input video data. The image processing system operates entirely on feature point trajectories through the input video data for rotation stabilization. The image processing system determines a series of key frames among all the video frames of the input video data. The term "key frames" refers to selected representative video frames of the input video data that are appropriately spaced to allow a determined amount of motion to occur between each pair of adjacent key frames. The determined amount of motion is also for reliable and effective 360-degree video data stabilization. After determining the series of key frames, based on the feature point trajectories, the image processing system estimates relative rotations of the appropriately spaced key frames using a 3D reasoning. The 3D reasoning refers to analyzing the key frames and estimating key frame rotations based on a 3D reconstruction. The image processing system also undoes the relative rotation between the key frames by applying the inverse transformation, and interpolates the adjustment across inner frames for inner frame optimization. The term "inner frames" refers to video frames of the input video data that are located in terms of timeline between the determined key frames. The image processing system switches to a 2D optimization to maximize visual smoothness of the feature point trajectories of the inner frames. In some embodiments, the image processing system also removes residual jitter that remains after most of the rotations are removed using methods described above.

After optimizing the visual smoothness of the inner frames, the image processing system has removed all rotations (e.g., including main rotations and residual jitter) from the input video data. In some embodiments, it is desirable to remove all rotations from an input video data, e.g., for VR experiences where any induced acceleration (such as rotation) can cause discomfort. In other embodiments, some original rotations are preferred to be preserved in the stabilized video, and for example, in a video taken while mountain biking where a camera makes slow turns, it causes direction of forward motion direction to drift away from the viewer's "front" direction, and in this case the video is not watched via VR system but on a computer or one a mobile device, it is better to preserve the overall camera front direction and just remove the rotations that have high-frequency jitter. In this case, the image processing system reapplies or adds back a smoothed version of the estimated rotations that are subtracted from the input video data previously to the current video in order to preserve the original desired rotations (e.g., original video orientation). The image processing system generates a 360-degree stabilized version of the input video data after applying the methods of the hybrid 3D-2D stabilization model to the input video data as described above.

At times, the input video data may have a speed of content change or a speed of scene change that varies dramatically and causes degraded user experience when a user watches the stabilized video. This may occur, e.g., in an input video data taken by a bicycle rider who rode in a relatively fast speed for a period of time and stopped in front of a traffic light and not moving for a few minutes. To address this problem, the image process system applies the hybrid 3D-2D stabilization model for generating a 360-degree stabilized video as well as a speed adjustment model to realize a constant speed of content change. For example, the image processing system adjusts video frames through the input video data by removing some video frames that share highly repetitive content (e.g., video frames taken when the camera is not moving or moving slowly), and adds more video frames (e.g., by copying and reusing current video frames) that share little content overlap (e.g., video frames taken when the camera is moving fast).

The hybrid 3D-2D stabilization model implemented by the image processing system has many benefits, including higher accuracy, higher robustness, strong positive effect on convergence, and higher processing speed. In more detail, the 3D analysis applied for estimating true rotations of the determined key frames focuses on rotations only, avoiding getting confused by mixed rotation and translation motion, varying feature density, non-static outlier features, etc. The determined key frames that are appropriately spaced allows for faster 3D estimation and produces smoother results than dense estimation between all successive video frames, which results in a higher robustness. The determined and fixed key frames also provide a regularizing backbone for the 2D optimization of the inner frames, which prevents generating new wobble artifacts, enabling a strong positive effect on convergence. The hybrid 3D-2D stabilization model also performs stabilization faster than playing the video at normal speed with high efficient algorithms.

The figures depict various embodiments of the present invention for purposes of illustration only. Once skilled in the art will readily recognize from the following discussion that alternative embodiments of the structures and methods illustrated herein may be employed without departing from the principles of the invention described herein.

DETAILED DESCRIPTION

System Architecture

Figure 1:
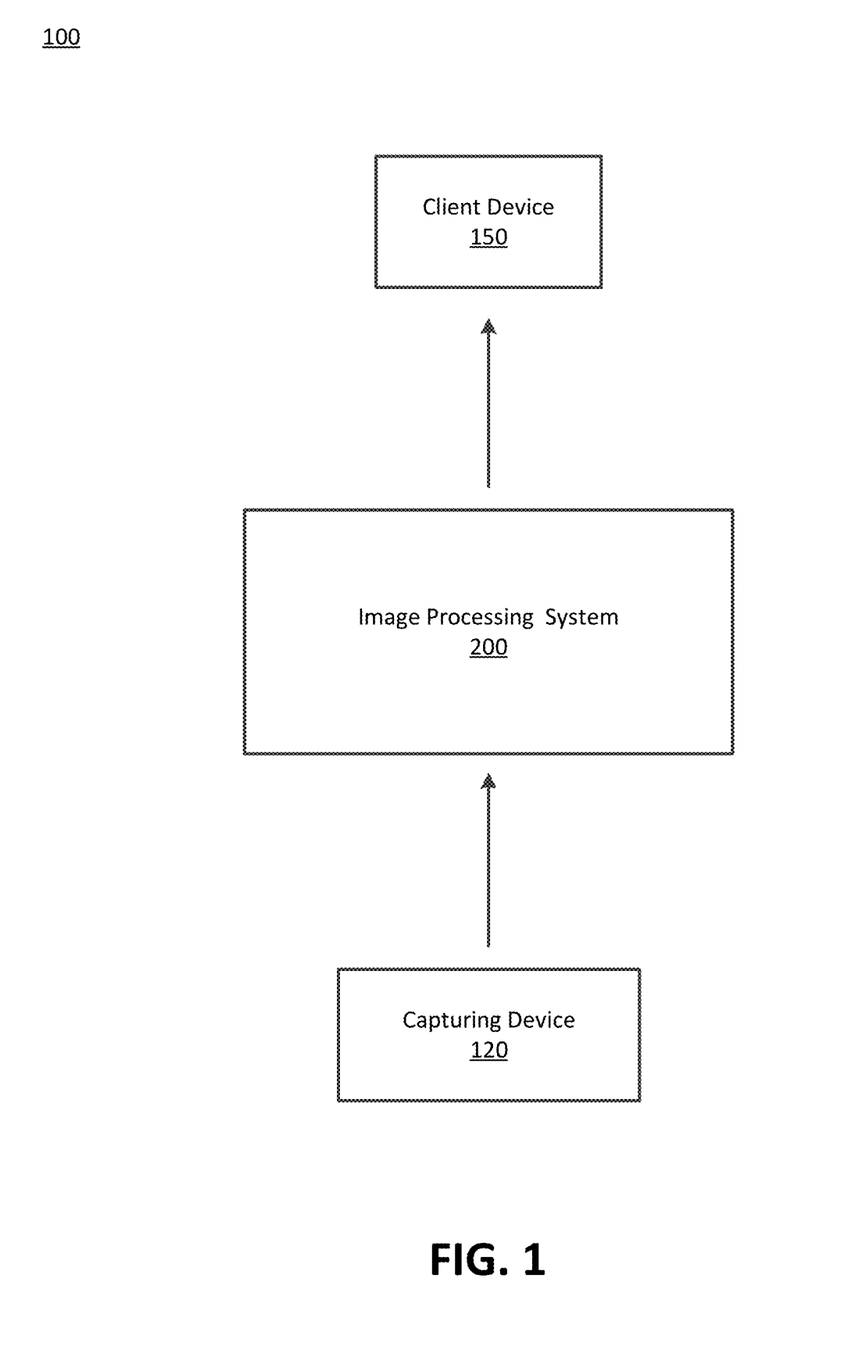
FIG. 1 is a block diagram of a system environment in which an image processing system operates, according to one embodiment.

FIG. 1 shows a block diagram of a system environment 100 in which an image processing system 200 operates, according to one embodiment. The system environment 100 shown in FIG. 1 includes a capturing device 120, an image processing system 200, and a client device 150. Only one capturing device 120, one image processing system 200 and one client device 150 are shown in FIG. 1 for purpose of illustration. In alternative embodiments not shown, the system environment 100 can include multiple capturing devices 120, image processing systems 200, client devices 150, and different and/or additional components. Likewise, the functions performed by various entities in the system environment 100 may differ in different embodiments.

The capturing device 120 captures images and videos of a scene, and the captured videos are used by the image processing system 200 for 360-degree stabilization. The capturing device can be any type of device that is capable of taking images and videos. For example, the capturing device 120 can be a hand-held camera, a mobile phone having a camera, a VR headset including a camera, etc. In some embodiments, the capturing device 120 is capable of taking 360-degree videos, e.g., an omnidirectional camera or a multi-camera system that can stitch videos taken by individual cameras to create a 360-degree video. The images or videos including all the video frames captured by the capturing device 120 are then output to the image processing system 200. In some embodiments, when shown in flat display surfaces (e.g., flat paper), the input video data use equirectangular projections, which has a well-known application in world map representations. In one embodiment, only one input video data is captured by the capturing device 120 and output to the image processing system 200 while in another embodiment, multiple input video data is captured and output to the image processing system.

The image processing system 200 receives input video data including all the video frames associated with each input video data captured by the capturing device 120. The image processing system 200 generates a 360-degree stabilized version of an input video data using a hybrid 3D-2D stabilization model. In more detail, for an input video data, the image processing system 200 first determines a set of feature points included in the video frames and tracks motion and movement of all the determined feature points through the video frames (e.g., all the video frames of the input video data). The image processing system 200 also determined a series of key frames from all the video frames of the input video data and estimates rotations of the determined key frames via a 3D reasoning. More specifically, "estimating rotations of the determined key frames" also means estimating relative rotations between every two adjacent key frames. After estimating the rotations of the key frames, the image processing system 200 optimizes visual smoothness of the inner frames via a 2D analysis. With the 3D analysis of key frame rotation estimation and the 2D optimization of the inner frames, the image processing system 200 removes most of the rotations included in the input video data, for example, rotations that resulted from camera shake. In some embodiments, some amount of residual jitters still remain in the processed video after the 3D analysis and the 2D optimization, and the image processing system 200 resolves the remaining residual jitters via, e.g., adding some flexibility to the hybrid 3D-2D stabilization model. Some residual jitters may result from a combination of small translational motion (e.g., bobbing while walking), parallax, suboptimal lens calibration, stitching artifacts, and rolling shutter wobble, and in some embodiments, the rolling shutter wobble causes most of the remaining residual jitters.

The image processing system 200 generates an intermediate 360-degree stabilized version of the input video data with all the rotations removed from the input video data. In some embodiments, it is desirable to preserve some original rotations (e.g., slow orientation change of the camera while the person holding the camera turns around to capture views of different angles), in which case the image processing system 200 reapplies a smoothed version of rotations that were previously subtracted from the input video data to the intermediate stabilized version of the input video data in order to preserve the desired original rotation. After preserving the desired original rotation, the image processing system 200 generates a finished 360-degree stabilized version of the input video data. The finished stabilized video is stored in the image processing system 200 as well as provided for presentation to one external client device 150 or multiple external client devices (not shown here).

In some embodiments, the image processing system 200 applies a speed adjustment model to realize smooth scene change of the 360-degree stabilized video, in which case, apart from generating a 360-degree stabilized version of a corresponding input video data via the hybrid 3D-2D stabilization model described above, the image processing system also makes the stabilized video have scene change with constant speed, allowing for better user experiences when presented to a user. For example, a user carrying a capturing device 120 (e.g., the user's smartphone) to record videos of scenes while riding a bike, and the speed of scene change may vary dramatically depending on whether the user is riding or stopping in front of a traffic light and not moving at all, in which case, when the user later replays the video he/she captured, even with a 360-degree stabilized video created using methods above, some part of the stabilized video may be boring to the user (e.g., captured when the user stopped in front of a red light without moving at all for 3 minutes) and the user may prefer to shorten the period of the video that scenes captured do not change a lot while to strengthen the period of the video that scenes change a lot. Under these circumstances, the image processing system 200 generates constant-speed 360-degree stabilized video data using a speed adjustment model to allow for more reasonably organized scene change with a relatively constant speed compared with the original input video data taken by the user. As one example, the speed adjustment model may reduce video frames having repetitive content while adding more video frames having less repetitive content.

In various embodiments, the speed adjustment model may be applied before, at the same time with, or after the hybrid 3D-2D stabilization model is applied to the input video data. As one example, the speed adjustment model is applied the key frame rotation estimation and inner frame optimization for the video data, and before a smoothed version of raw rotations is reapplied to the video data. The generated constant-speed 360-degree stabilized video data is also a finished 360-degree stabilized video data and is stored in the image processing system 200 as well as provided to the client device 150 when needed.

The client device 150 receives the finished 360-degree stabilized video data from the image processing system 200 for presentation to a viewer of the client device. In one embodiment, the client device 150 that receives the finished stabilized video can be the same or be included in or include the capturing device 120. As one example, the capturing device 120 is a camera that is embedded in the client device 150 (e.g., a mobile phone). In another embodiment, the client device 150 and the capturing device 120 can be separate from each other. The client device 150 can be any type of user device that is capable of receiving and playing the finished stabilized 360-degree video data received from the image processing system 200. Example client devices 150 include personal computers, hand-held laptop computers, mobile phones, VR headsets, etc. The finished stabilized 360-degree video data may be provided to the client device 150 for a variety of purposes. As one example, the finished 360-degree stabilized video data may be presented to a client device 150 (e.g., a mobile phone) for a user of the client device to view stabilized videos of natural scenes (e.g., mountains, rivers) taken by the user. As another example, the finished 360-degree stabilized video data is provided to a client device 150 (e.g., a laptop computer) for a user of the client device to pan and rotate the 360-degree video data's perspective to watch it from different angles by dragging with the mouse of the laptop computer or fingering on the laptop computer. As a further example, the finished 360-degree stabilized video data is provided to a client device 150 that is a VR headset for a user of the VR headset to experience 360 virtual scenes with more stabilized viewing effect.

In some embodiments, only one client device 150 is provided with the finished 360-degree stabilized video data from the image processing system 200, and for example, a user records his/her biking experiences and wants to review a 360-degree stabilized version of his/her own biking experiences. In other embodiments, multiple client devices (not shown here) are provided with a same finished 360-degree stabilized video data, and for example, a 360-degree stabilized version of a video for a game scene is provided to different users wearing VR headsets to experience 3D virtual effect of the game scene.

Image Processing System

Figure 2:
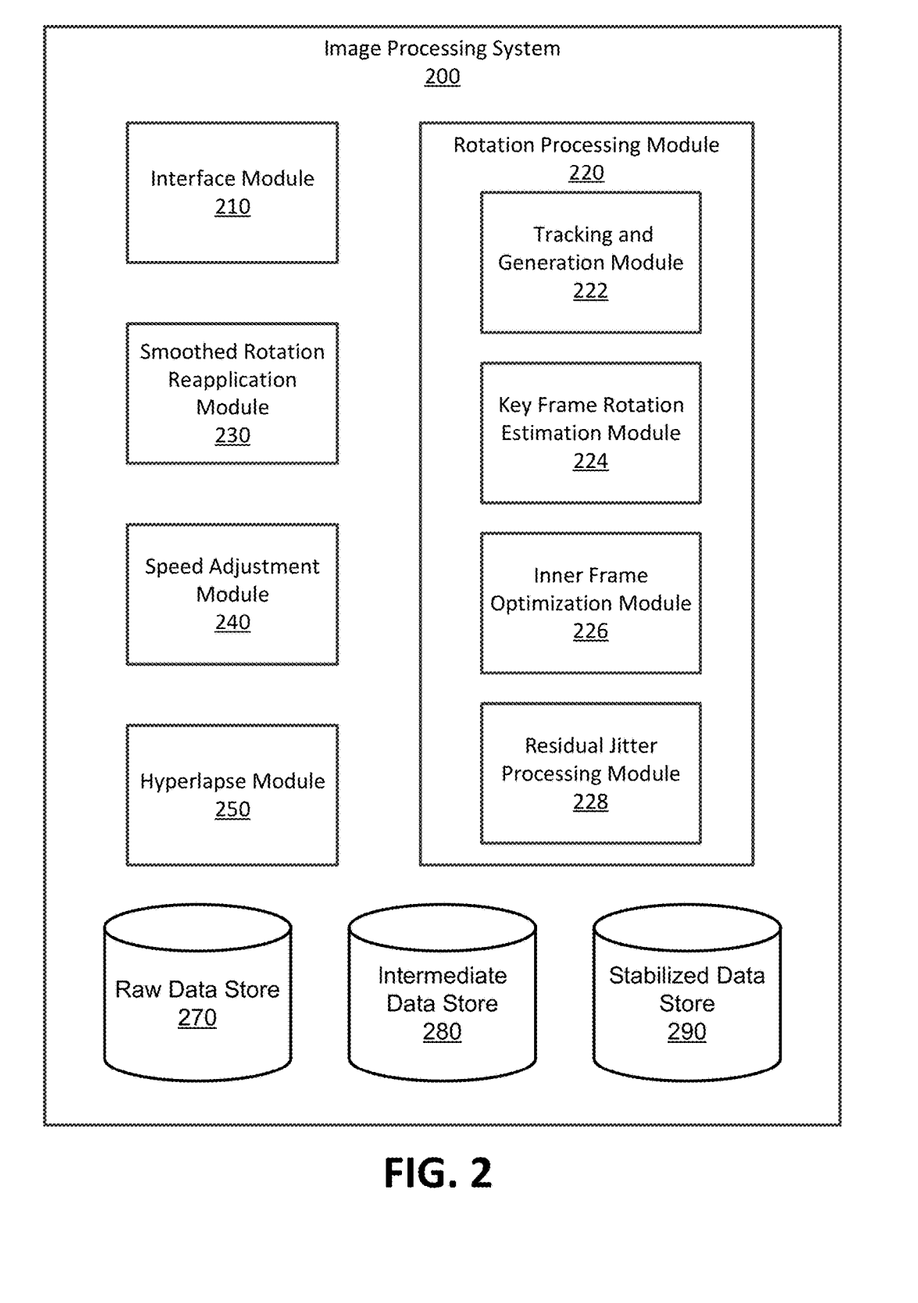
FIG. 2 is an example block diagram of an architecture of the image processing system shown in FIG. 1, according to one embodiment.

FIG. 2 shows an example block diagram of the image processing system 200 shown in FIG. 1, according to one embodiment. As described above in FIG. 1, the image processing system 200 receives an input video data from the capturing device 120 and generates a finished 360-degree stabilized video data for presentation to the client device 150. In some embodiments, the finished 360-degree stabilized video may be a constant-speed video with a relatively constant speed of content change. In some embodiments, the finished 360-degree stabilized video data may have all rotations removed from the input video data with no original rotations that need to be preserved, and in other embodiments, the finished 360-degree stabilized video data preserves some original rotations included in the input video data that are desired and removes only necessary rotations (e.g., high frequency jittering).

In FIG. 2, the image processing system 200 includes an interface module 210, a rotation processing module 220, a smoothed rotation reapplication module 230, a speed adjustment module 240, a hyperlapse module 250, a raw data store 270, an intermediate data store 280, and a stabilized data store 290. In alternative embodiments not shown, additional and/or different components may be included in the image processing system 200. Likewise, the functions performed by various entities of the image processing system 200 may differ in different embodiments.

The interface module 210 receives input data from the capturing device 120 as well as provides output data to the client device 150, and the received input data is stored in the raw data store 270 and the output data is stored in the stabilized data store 290. More specifically, the interface module 210 receives one or more input video data including all the static video frames of each input video data from the capturing device 120, and outputs a finished 360-degree stabilized version of the input video data to the client device 150. The finished 360-degree stabilized version of the input video data may be a constant-speed version or not depending on the characteristics of the input video data, as described above.

The rotation processing module 220 extracts the input video data including all the static video frames stored in the raw data store 270, and generates an intermediate 360-degree stabilized version of the input video data with all the rotations removed from the input video data, and the generated intermediate version is stored in the intermediate data store 280. In more detail, as shown in FIG. 2, the rotation processing module 220 further includes a tracking and generation module 222, a key frame rotation estimation module 224, an inner frame optimization module 226, and a residual jitter processing module 228.

The tracking and generation module 222 determines a set of feature points included in the input video data as well as a series of key frames of the input video data. The tracking and generation module 222 also tracks motion of the determined feature points through all the video frames of the input video data. The data including feature points and key frames generated by the tracking and generation module 222 is stored in the intermediate data store 280, and used by the key frame rotation estimation module 224 to estimate rotations of the key frames. As described above, in some embodiments, the video frames have equirectangular projections, which are highly distorted near the poles, and in this case the tracking and generation module 222 converts the video frames into a less distorted cube map representation for feature point tracking. As one example, the cube face size used in the cube map representation is 256 by 256 pixels independent of resolution of the input video data, and the luma plane is used for later feature point tracking. In some embodiments, the tracking and generation module 222 uses an algorithm like the Lukas-Kanade method for the feature point tracking. In more detail, if a tracked point falls outside its originating cube face, the tracking and generation module 222 simply drops that observation and ends the track there. While tracking points on planar cube faces, the tracking and generation module 222 immediately converts the 2D locations to 3D unit vectors and stores them in a track table, and all subsequent processing is done in terms of these 3D unit vectors. The 3D unit vectors, as used herein, refer to a way to represent a direction in space, and in one embodiment, the 3D unit vectors form a 3D sphere (not shown here) with 8 equal sized triangular octants, In terms of feature point tracking, in one embodiment, the tracking and generation module 222 spawns new tracks for subsequent tracking. Some algorithms, like Shi-Tomasi corner detection algorithm, are used to generate a list of feature points, sorted by decreasing feature strength. The tracking and generation module 222 walks through the list and accepts a feature for spawning a new track only if it is more than 2 degree away from any previously selected or actively tracked feature.

As described above, the term "key frames" refers to selected representative video frames of the input video data that are spaced to allow a determined amount of motion to occur between each pair of adjacent key frames for reliable and effective 360-degree video data stabilization. In more detail, the key frames are spaced appropriately such that less error is accumulated when applying the rotation estimation. The key frames are spaced appropriately to maximize smoothness such that the 2D optimization renders satisfying performance when smoothing the inner frames separated by the key frames, and the 2D optimization is faster than the rotation estimation. In terms of generating key frames during the feature point tracking, the tracking and generation module 222 determines the first video frame of the input video data to be a key frame, and determines subsequent frames as key frames based on multiple factors. One example factor can be that whether points tracked with successive Lucas-Lanade alignment slowly drifts away from their original appearance due to alignment error accumulation. In one embodiment, the tracking and generation module 222 turns current video frame into a key frame if its presentation time stamp difference to the last key frame amounts to more than a threshold (e.g., three seconds). Another example factor can be that whether sufficient common tracks between subsequent key frames are generated to realize reliable key frame rotation estimation by the key frame rotation estimation module 224, as described below. As described above, with the 3D sphere formed by the 3D unit vectors, the tracking and generation module 222 counts at key frames the number of tracks within each octant of the 3D sphere, and keeps track of the fraction of tracks from each bin (also referred to as "octant") than remains active. The tracking and generation module 222 turns the previous video frame into a key frame if the fraction drops below a threshold (e.g., 50%) in at least one bin, and the reason for turning the previous video frame instead of the current video frame into a key frame is that with the previous video frame counted, there have been sufficient tracks.

The key frame estimation rotation module 224 estimates relative rotation between the successive key frames determined by the tracking and generation module 222. As described above, the key frame estimation rotation module 224 estimates key frame rotations via a 3D reasoning or a 3D analysis. In more detail, the "3D reasoning", as used herein, refers to analyzing and reconstructing video data (e.g., key frames) via employing and running 3D reconstruction algorithms. As one example, one 3D reconstruction algorithm is a variant of so-called "5-point algorithm", and the "5-point algorithm" determines relative rotations and translations for pre-determined 5 points identified in two different video data (e.g., two video frames representing two views). In some embodiments, the key frame rotation estimation module 224 runs the 3D construction algorithm (e.g., the variant of the 5-point algorithm) only between pairs of key frames instead of running between pairs of all possible video frames and instead of reconstructing all video frames including key frames and inner frames altogether. In one embodiment, the 3D reasoning used by the key frame rotation estimation module 224 allows for robust 3D reconstruction when there is only rotation without translation (the amount of translations recovered by the 3D reconstruction is close to zero or is exactly zero). The key frame rotation estimation module 224 can also identify small rotations apart from small translations via employing the 3D construction algorithms (e.g., the variant of 5-point algorithm).

In more detail, the key frame rotation estimation module 224 may use a set to represent the set of determined key frames, such as $K=\{k_i\}$, and $(k_i, k_{i+1})$ represents each pair of successive key frames. The key frame rotation estimation module 224 obtains a set of matching point pairs from the feature tracks. In terms of estimating rotations of the key frames, the key frame rotation estimation module 224 uses some algorithms, for example, uses OpenGV library implementation of Nister's five-point algorithm in a RANSAC procedure or Strewenius 5-point algorithm, and the relative rotation for a key frame $k_i$ is represented as $\tilde{R}_{k_i}$. The key frame rotation estimation module 224 also uses a relatively lenient inlier threshold to tolerate some amount of image deformation from rolling shutter and lens deformation. In some embodiments, the key frame rotation estimation module 224 recursively splits the segment and insert a new key frame in the middle if the number of inliers is below a threshold fraction of 0.5, which tends to increase the number of inliers as the new key frame pairs are more similar to each other. The segment, as used herein, refers to sequence of frames bounded by two subsequent key frames. The key frame rotation estimation module 224 repeats this procedure until the inlier threshold is satisfied or until there is no space to insert new key frames. The procedure, as used herein, refers to a process of checking for the thresholds as described above to determine whether to split or not. In some embodiments, the key frame rotation estimation module 224 directly finds the rotation that minimizes the relative distances between matched points instead of using the five-point algorithm if the number of features in a key frame pair is below eight matches.

After the key frame rotation is estimated, the key frame rotation estimation module 224 stores the inverse transformation that is represented as $R_{k_i}=(\Pi_{j=1}^{i}\tilde{R}_{k_j})^{-1}$ and applies $R_{k_i}$ rotations to the key frames to remove all relative rotations from the input video data, which further stabilizes the input video data.

The inner frame optimization module 226 determines rotations of the inner frames between the key frames to optimize visual smoothness of the inner frames. As described above, in some embodiments, the inner frame optimization module 226 employs a 2D analysis. The 2D analysis is used to optimize inner frame rotations such that the feature point trajectories become as smooth as possible, and one of the reasons for being called "2D" is that the 2D analysis forms "feature point trajectories" that are visual in a 2D image space rather than in a reconstructed 3D space. In more detail, the inner frame optimization module 226 determines a set of tracks that are represented as a mathematical set: $T=\{T_i\}$, with each track being a list of observations (3D unit vectors described above) that are represented as $T_i=\{P_j^i|j\in f_i \ldots l_i\}$, and $f_i \ldots l_i$ represent a series of video frames in which the track is observed, and for example, the track for the series of video frames $f_i \ldots l_i$ is $T_i$. In some embodiments, within each track, both the starting inner frame (or the first inner frame) and the ending inner frame (or the last inner frame) are two consecutive key frames within which the inner frames for this track are included, and for example, $f_i$, as the starting inner frame of the track $T_i$, is a key frame, and $l_i$, as the ending inner frame of the track $T_i$, is the next key frame right after key frame represented by $f_i$, and the other inner frames between the starting inner frame (e.g., $f_i$ in this example) and the ending inner frame (e.g., $l_i$ in this example) are not determined key frames. All the tracks that each includes a corresponding set of inner frames form visual trajectories that can be plotted on the input video data, as further described with respect to FIG. 3C. The inner frame optimization module 226 optimizes the inner frame rotations such that these trajectories become as smooth as possible.

The residual jitter processing module 228 removes residual jitters remaining in the processed input video data by the tracking and generation module 222, the key frame rotation estimation module 224, and the inner frame optimization module 226. The residual jitters herein refers to the remaining rotations that remains in the input video data after the input video data is processed by module 222, 224 and 226, and the processed video has most of rotations removed, for example, jitters resulting from shake of the capturing device 120. Example residual jitter is due to a combination of the following factors: small translational motion (e.g., bobbing while walking), parallax, suboptimal lens calibration, stitching artifacts, and rolling shutter wobble. In one embodiment, the residual jitter processing module 228 address the residual jitter by adding some flexibility to current model being used for removing rotations such that current model can adapt and undo slight image deformations. In one embodiment, the residual jitter processing module 228 controls amount of flexibility added to current model, preventing current model from becoming too flexible and from introducing artifacts instead of overfitting data and removing rotations.

In some embodiments, most of the residual jitter is due to rolling shutter wobble. The residual jitter processing module 228 may create a model of the rolling shutter wobble based on accessible characteristics of the rolling shutter. In terms of some concerns that may arise for acquiring accessible characteristics of the rolling shutter and for creating a model of the rolling shutter wobble, the residual jitter processing module 228 applies a generic deformation model combined with a unit sphere to solve the concerns, as more fully described below with reference to FIG. 4A. In more detail, possible concerns may include requirement of calibrating each camera involved in the 360-degree video data, a non-trivial transformation when converting to a projection where current model algorithms operates undergone by sensor scanlines of 360-degree cameras that use fisheye lenses, and extra residual jitter that result from other sources.

Figure 4:
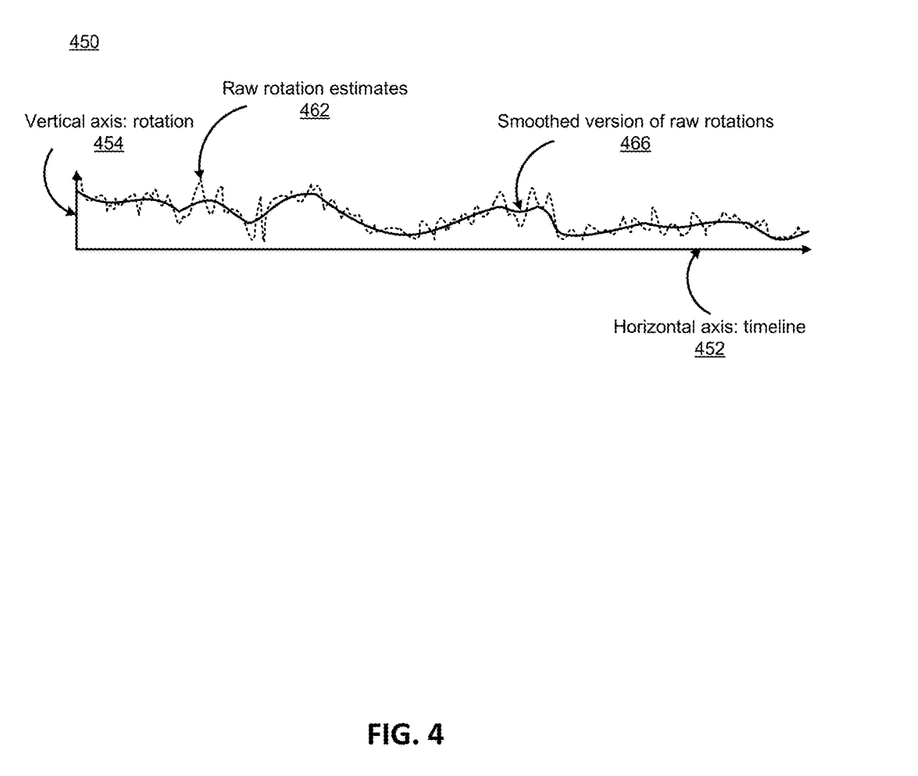
FIG. 4 is a graph including raw rotation estimates of an input video data and a smoothed version of raw rotations reapplied to the input video data, according to one embodiment.

The smoothed rotation reapplication module 230 reapplies or adds back a smoothed version of raw rotation estimates that were previously removed from the input video data, and related data is stored in the intermediate data store 280. As described above, the input video data processed by the rotation processing module 220 have all the rotations in the input video data removed, including some desirable original rotations that are preferred to be preserved. As one example, in an input video data such as mountain biking, where the capturing device 120 makes slow turns and it causes direction of forward motion direction to drift away from the viewer's "front" direction, and in a case the video is watched on a computer or mobile device instead of in a VR headset, the overall camera forward front direction is desired to be preserved with high frequency jitter preferred to be removed. In terms of reapplying the smoothed version of raw rotations subtracted from the input video data by the rotation processing module 220, in one embodiment, the smoothed rotation reapplication module 230 computes the smoothed rotations by low-pass filtering their quaternion representation temporally, smoothing each of the four quaternion components independently and normalizing the result. A comparison between a raw rotation estimates and the smoothed curve that is reapplied to the input video data is described below with reference to FIG. 4B.

The speed adjustment module 240 generates a constant-speed 360-degree stabilized version of the input video data, and the generated constant-speed 360-degree stabilized video and related data is stored in the stabilized data store 290. As described above, the constant-speed 360-degree stabilized video refers to a 360-degree stabilized version of the input video data having constant-speed of content change. For an input video data that has undesirable speed of content change (too fast or too slow for a series of continuous video frames), the speed adjustment module 240 applies a speed adjustment model to the input video data to realize the constant speed while the input video data is processed by the rotation processing module 220 and/or the smoothed rotation reapplication module to realize stabilization of the input video data. As one example, the speed adjustment module 240 reduces video frames having repetitive content while adding more video frames having more novel content and less repetitive content. The repetitive content included in a series of video frames indicates the video frames share a relatively large amount of overlap of content, and it may be because the capturing device 120 taking these videos is not moving. The more novel content and less repetitive content included in a series of video frames indicates the video frames share a relatively small amount of overlap of content with video content captured by these frames being identifiably different from each other, and this may be because the capturing device 120 taking this video is moving in a relatively high speed. A detailed explanation is described below with reference to FIGS. 5A-5B of a comparison between the 360-degree stabilized version of the input video data before and after the speed adjustment model is applied.

The hyperlapse module 250 creates speed-up hyperlapse videos based on the generated 360-degree stabilized videos by modules described above, and the created speed-up hyperlapse videos are stored in the stabilized video store 290. In one embodiment, the hyperlapse module 250 creates a hyperlapse video via dropping all but pre-determined evenly spaced video frames in a sequence of video frames that are already stabilized via the hybrid 3D-2D stabilization model. As one example, to speed up a video 10 times, the hyperlapse module 250 keeps only the $10^{th}$ frame, $20^{th}$ frame, $30^{th}$ frame, $40^{th}$ frame . . . in the sequence of the video frames stabilized by the hybrid stabilization model. In one embodiment, the hyperlaspe module 250 does not differentiate key frames and inner frames. In another embodiment, considering a common element of hyperlapse videography that is a smoothly balanced camera velocity, the hyperlapse module 250 modifies the apparent camera velocity by remapping the video frame timestamps in the stabilized video. In more detail, the hyperlapse module 250 first estimates camera velocity at every video frame, and instead of turning to 3D reconstruction, the hyperlapse module 250 applies a simple 2D approximation, which is a robust average of the after-stabilization motion vector magnitudes. With 360-degree video data having all angles displayed, the hyperlapse module 250 generates a robust and reliable speed-up hyperlapse videos based on the methods described above. The hyperlapse module 250 also computes a median motion vector magnitude for each video frame, and then it removes outliers using a running temporal median (e.g., radius 4 seconds) followed by a low pass filter. The smoothed velocity estimate is used to simulate a constant camera velocity by remapping the video frame timestamps inversely proportional to the cumulative velocity function. In some embodiments, the hyperlapse module 250 correlates with the smoothed rotation reapplication module 230 to yield more reliable effect of reapplication of smoothed version of raw rotations. As one example, when the smoothed rotation reapplication module 230 uses a low-pass filter to filter an orientation curve, modified timestamps by the hyperlapse module 250 needs to be considered.

The raw data store 270 stores input video data that is received by the interface module 210 and used for removing undesirable rotations to generate a 360-degree stabilized version of the input video data. In some embodiments, the input video data is a 360-degree video data. As described above, a 360-degree video data shows 360-180 degree view of scenes captured by an omnidirectional camera or a multi-camera system with views taken by individual cameras stitched together, and while projected to a flat paper, a representation of equirectangular projection is used to represent a 360-180 degree view of a video frame of the 360-degree video data, as more fully described in FIG. 3C. The raw data store 270 also stores the series of continuous static video frames of the input video data with each frame indexed by, e.g., timestamp or frame number.

The intermediate data store 280 stores intermediate data generated by different modules shown in FIG. 2. In more detail, the intermediate data includes data related to feature points and key frames determined by the tracking and generation module 222, data related to key frame rotation estimates determined by the key frame rotation estimation module 224, data related to optimized rotations of the inner frames generated by the inner frame optimization module 226, data related to residual jitter identified by the residual jitter processing module 228, data related to smoothed curve used by the smoothed rotation reapplication module 230, and data related to speed adjustment module 240 and the hyperlapse module 250. The intermediate data store 280 also stores any intermediate version of the input video data, and an intermediate version of the input video data refers to the input video data processed by one or more modules before turning into a 360-degree stabilized version of the input video data.

The stabilized data store 290 stores finished 360-degree stabilized video, which is a stabilized version of the input video data. In one embodiment, the finished 360-degree stabilized video has all necessary rotations being removed with some desired original rotations preserved. In another embodiment, the finished 360-degree stabilized video has or does not have constant speed of content change depending on whether the video frames of the input video data needs to be adjusted via the speed adjustment model.

Hybrid 3D-2D Stabilization Model

Figure 3A:
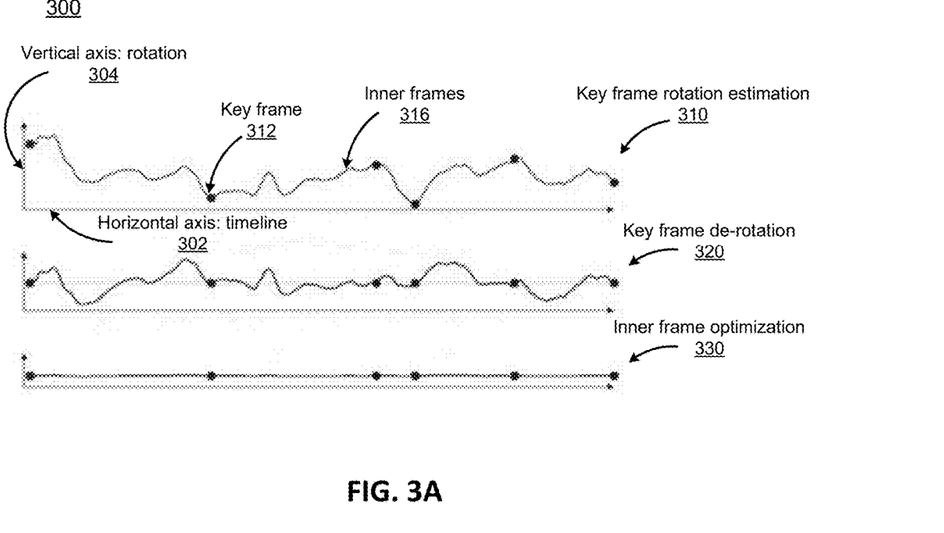
FIG. 3A is a graph illustrating a hybrid 3D-2D stabilization model to realize 360-degree video data stabilization by the image processing system shown in FIG. 2, according to one embodiment.

FIG. 3A shows graphs 310, 320 and 330 illustrating a hybrid 3D-2D stabilization model to realize 360-degree video data stabilization by the image processing system 200 shown in FIG. 2, according to one embodiment. In FIG. 3A, the graphs 310 illustrating key frame rotation estimation, the graph 320 illustrating key frame de-rotation, and the graph 330 illustrating inner frame optimization are shown. Each of the graphs 310, 320 and 330 includes a horizontal axis 302 representing video frame timeline (e.g., timestamp or frame number), and a vertical axis 304 representation rotation of video frames over the video frame timeline. For purpose of illustration, only one degree of freedom is shown for the rotation represented by the vertical axis 304. Each of the graphs 310, 320 and 220 also highlights a series of key frames 312 that are specified by a solid black dot, and video frames between every pair of adjacent key frames are inner frames 316 between the corresponding two key frames.

In more detail, the three graphs 310, 320 and 330 show a series of consecutive video frames that are originated from a same input video data and that include a same set of key frames 312 and inner frames 316 but with different amount of rotation over time. More specifically, the graph 310 shows key frame rotation estimation via a 3D analysis, which estimates relative rotations of the key frames 312 that are appropriately spaced. The graph 320 shows key frame de-rotation, which undoes the relative rotation between the key frames and interpolates adjustment for inner frames 316. While undoing the key frame rotation, the inverse transformation may be applied to the key frames 312. The graph 330 shows inner frame optimization via a 2D analysis, which maximizes the smoothness of the stabilized feature points trajectories, as described above. The hybrid 3D-2D stabilization model allows slight deviation from pure rotation at inner frames to account for residual jitter from parallax and rolling shutter wobble. As shown in FIG. 3A, the rotation represented by the vertical axis 304 is reduced for both the key frames 312 and the inner frames 316, and specifically, the graph 330 shows rotations for all the video frames (including both key frames and inner frames) are reduced to a threshold level or removed from the input video data.

Figure 3B:
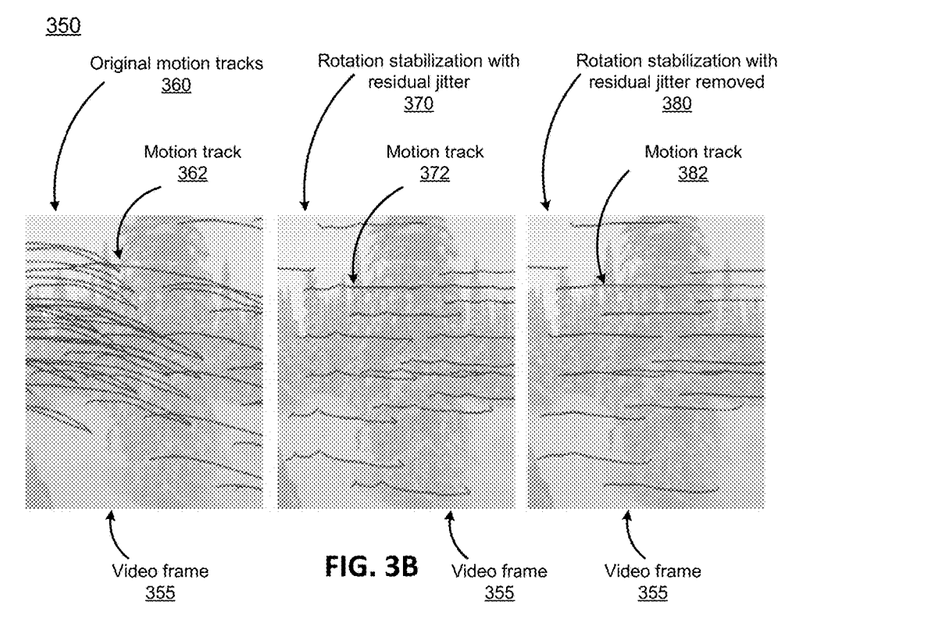
FIG. 3B shows, for a same video frame, a comparison among original motion tracks, rotation stabilization with residual jitter, and rotation stabilization with residual jitter removed, according to one embodiment.

FIG. 3B shows, for a same video frame 355, a comparison among original motion tracks 360, rotation stabilization with residual jitter 370, and rotation stabilization with residual jitter removed 380, according to one embodiment. In the video frame 355, motion tracks 362, 372 and 382 are plotted and displayed. As described above, a motion track (or a track), as used herein, refers to movement of a feature point through all the inner frames between a pair of adjacent key frames, and the motion tracks form visual trajectories. In one embodiment, the motion track 362, 372 and 382 correspond to a same feature point through a same set of inner frames between two adjacent key frames. As illustrated in FIG. 3B, the original motion tracks 360 represented by motion track 362 shows an original video frame with a relatively large amount of rotation, the motion tracks represented by motion track 372 shows a stabilized version of the video frame with most of the rotations being removed while a small amount of residual jitter remaining 370, and the motion tracks represented by motion track 382 shows a further stabilized version of the video frame with the residual jitter also being removed. Accordingly, from motion track 362, to motion track 372, and further to motion track 382, the visual trajectories are becoming smoother and smoother.

Figure 3C:
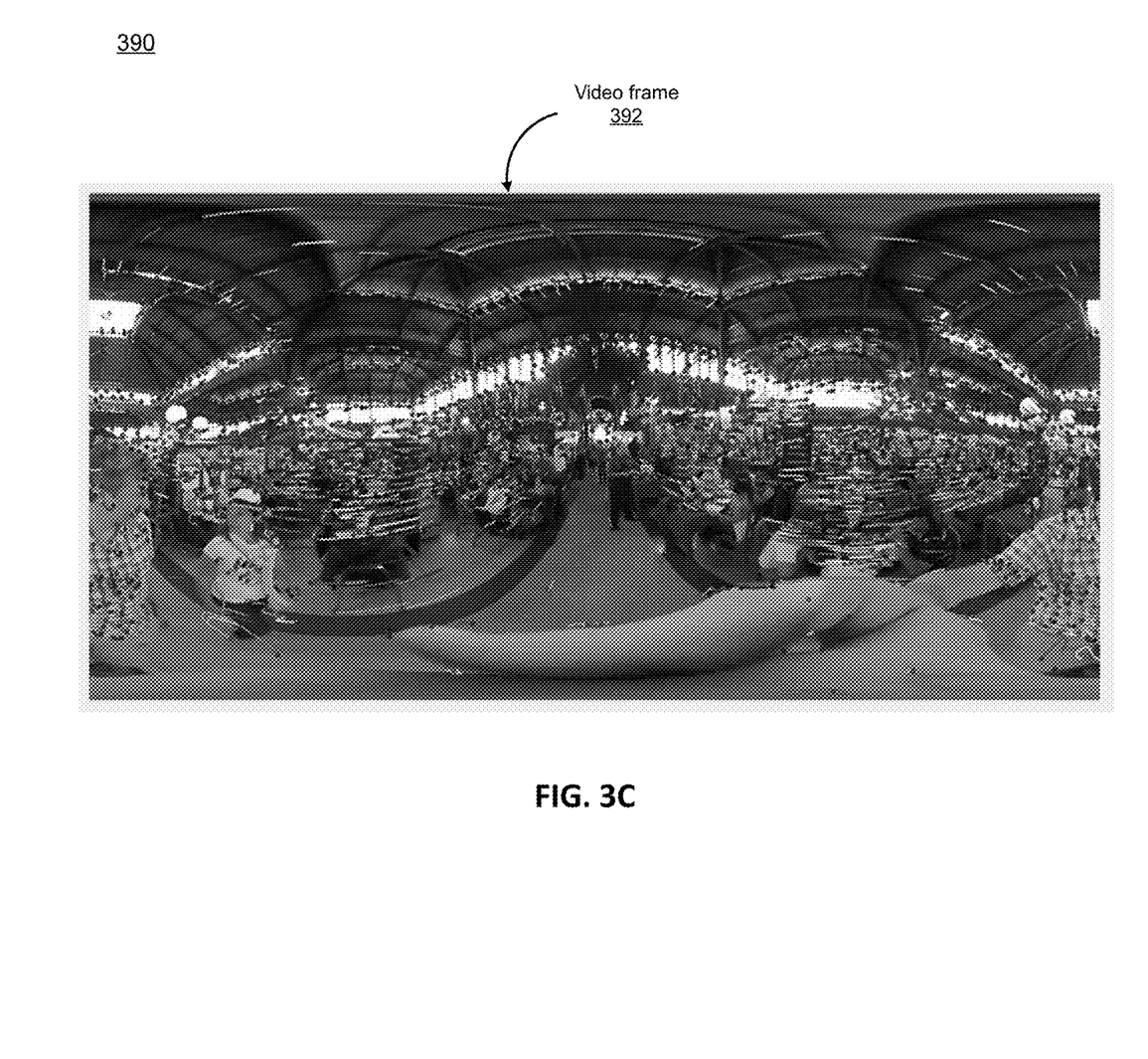
FIG. 3C shows an equirectangular projection of an example 360-degree video data frame including motion tracks of feature points, according to one example.

FIG. 3C shows equirectangular projection 390 of an example 360-degree video data frame 392 including motion tracks of feature points, according to one example. The equirectangular projection 390 shows a representation of a 360-180 degree view of the scene captured by the video frame 392, and visual trajectories of motion tracks plotted on the equirectangular projection.

FIG. 4 shows a graph 450 including raw rotation estimates 462 of an input video data and a smoothed version of raw rotations 466 reapplied to the input video data, according to one embodiment. In FIG. 4, the graph 450 has a horizontal axis 452 representing video frame timeline (e.g., timestamp or frame number), and a vertical axis 454 representing rotation of video frames of the input video data over time (the timeline 452). The graph 450 also shows that raw rotation estimates 462 of the input video data that is represented by a dashed curve, and a smoothed version of raw rotations 466 reapplied to the input video data that is represented by a solid curve. As described above, the smoothed version of raw rotations is reapplied or added back to the input video data that has all rotations removed to preserve some desired original rotations (e.g., overall camera forward direction).

Figure 5A:
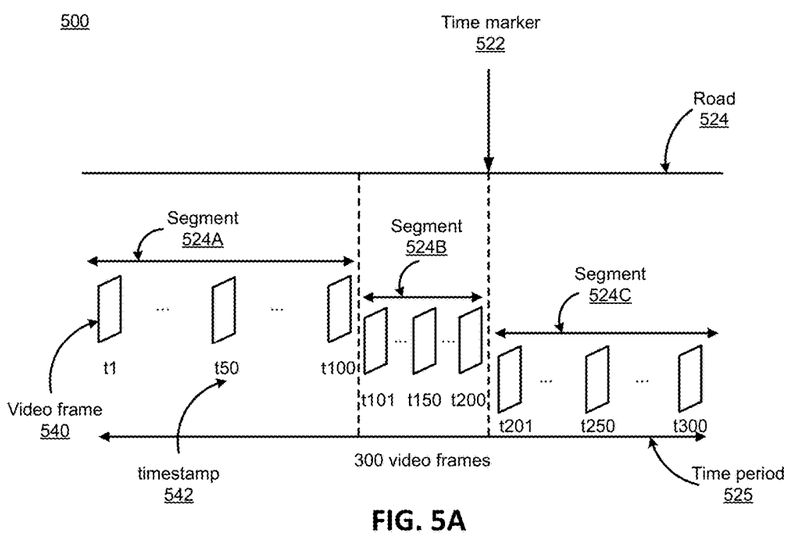
FIG. 5A shows an input video data having varying speed of content change before the speed adjustment model is applied to the input video data, according to one embodiment.
Figure 5B:
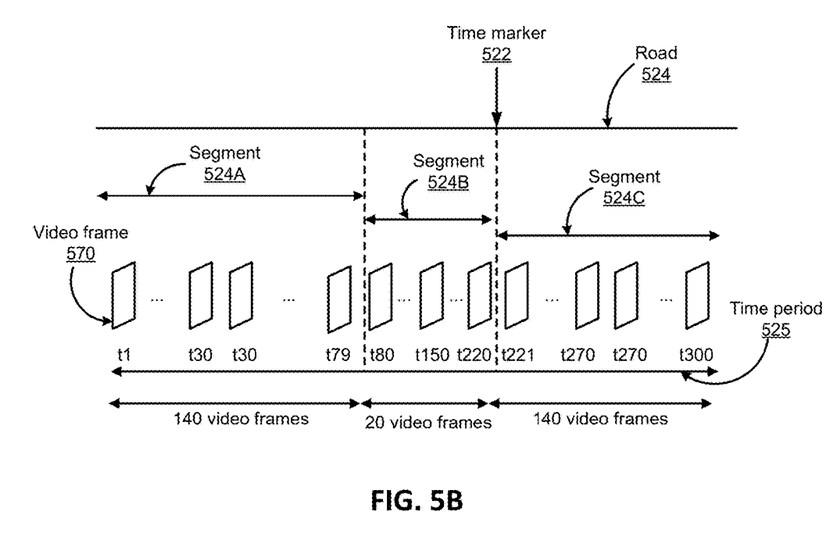
FIG. 5B shows the input video data having constant speed of content change after the speed adjustment model is applied to the input video data, according to one embodiment.

FIGS. 5A-5B show applying a speed adjustment model to a 360-degree stabilized video to realize constant speed of video frame content change of the stabilized video, according to one embodiment, and more specifically, FIG. 5A shows an input video data having varying speed of content change before the speed adjustment model is applied to the input video data, according to one embodiment. In more detail, in FIG. 5A, the input video data includes a series of consecutive video frames 540 captured in a context where a user is riding a bike along a road 524, and the user is carrying a camera that captures the video frames at a fixed and predetermined frame rate. The distance of the road 524 is divided into three segments: segment 524A, segment 524B, and segment 524C, and due to the fixed frame rate used while recording scenes along the whole distance of the road 524, for each segment, a same number of video frames (e.g., 100 frames here) corresponding to a same period of time are captured corresponding to that segment. The video frames 540 are also indexed by timestamp 542. As shown in FIG. 5A, video frames 540 from t1 to t300 represent a time period 525 (e.g., 6 minutes), and in more detail, video frames that correspond to timestamp t1 through t100 (e.g., the first 2 minutes) capture and record scenes for segment 524A of the road 524, video frames that correspond to timestamp t101 through t200 (e.g., 2 minutes in between) capture and record scenes for segment 524B of the road 524, and video frames that correspond to timestamp t201 through t300 (e.g., the last 2 minutes) capture and record scenes for segment 524C of the road. FIG. 5A also shows a time marker 522 that marks the time of video frame t200, which also corresponds to a location of the intersection between segment 524B and segment 524C of the road 524. As one example, a traffic light (not shown here) is located in the intersection between segment 524B and segment 524C, and the user rode his/her bike with a certain speed without stopping during segment 524A, slowed down when he/she saw the traffic light turned red and eventually stopped in front of the traffic light during segment 524B, and after the traffic light turned green, the user accelerated and then rode with another certain speed during segment 524C. As described above, the user spent same amount of time with same number of video frames 540 captured in each segment while with different distances he/she rode through, in which case the speed of scene change captured by different set of video frames that correspond to different segments may vary. For example, 250 meters were covered by the user for segment 524A, 10 meters for segment 524B, and 150 meters for segment 524C, and among the three segments, speed of scene change for segment 524A is the highest, then speed of scene change for segment 524B is secondary, and speed of scene change for segment 524C is the lowest. When watching the input video data later, even with a 360-degree stabilized version, the user may fee boring for video content corresponding to segment 524B.

FIG. 5B shows the input video data having constant speed of content change after the speed adjustment model is applied to the input video data, according to one embodiment. With the same time period 525 (e.g., 6 minutes as described above) that has the same number of video frames (e.g., 300 frames) as FIG. 5A, the video frames 570 show a constant speed of content change of the scenes captured by the input video data, which allows better user experience when the user watches the video (e.g., a 360-degree stabilized version) later. The video frames shown in FIG. 5B are selected from the video frames 540 shown in FIG. 5A, e.g., video frame indexed by t30 in FIG. 5B is the same video frame indexed by t30 in FIG. 5A (not shown here). As described above, the speed adjustment model may remove video frames that have a relatively large amount of repetitive information, and adds more video frames that have a relatively small amount of repetitive information or that have different information through consecutive frames (e.g., some video frames corresponding to segment 524A or 524C). More specifically, for segment 524A and segment 524C, the video frames 540 of which has less repetitive information than video frames corresponding to the segment 524B in FIG. 5A, some video frames 570 (e.g., video frames indexed by t30 and t270) are reused and more video frames (e.g., 140 video frames) out of the total 300 video frames are used for these two segments in FIG. 5B. In contrast, for segment 524B, the video frames 540 of which has more repetitive information, some video frames 570 are removed and fewer (e.g., 20 video frames) are used for this segment in FIG. 5B.

Figure 6:
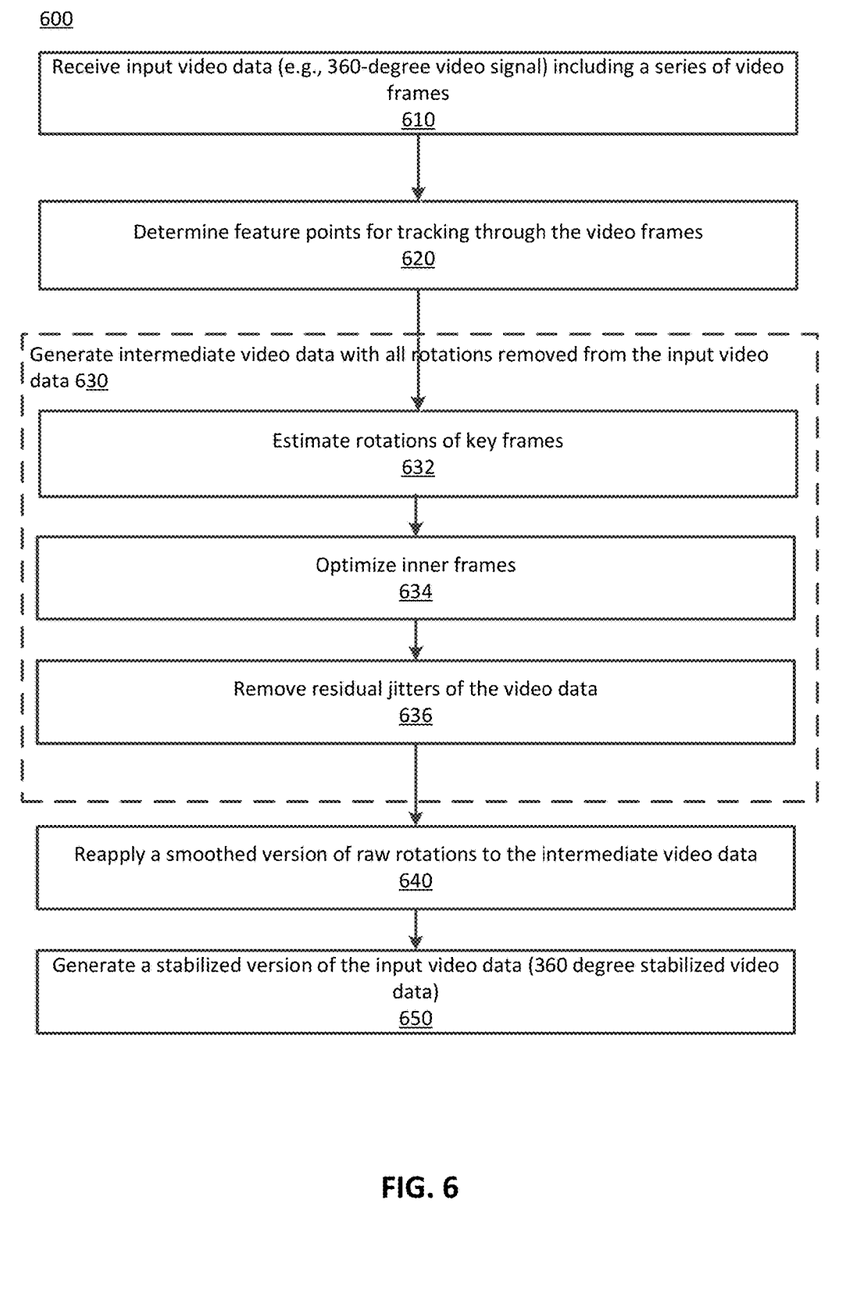
FIG. 6 is a flowchart illustrating a process of generating a 360-degree stabilized video via the image processing system, according to one embodiment.

FIG. 6 shows an example flowchart 600 illustrating a process of generating a 360-degree stabilized video via the image processing system 200, according to one embodiment. Initially, the image processing system 200 receives 610 an input video data (e.g., 360-degree video data) for rotation stabilization, and the input video data includes a series of consecutive video frames. The image processing system 200 determines 620 feature points captured in the input video data, and tracks these feature points through the series of video frames. The tracked feature points form visual feature point trajectories plotted onto the video frames. The image processing system 200 then generates 630 an intermediate video with all rotations included in the input video data being removed. In more detail, the image processing system 200 first estimates 632 key frame rotations using a 3D analysis, then optimizes 634 inner frames using a 2D analysis to make inner frames as smooth as possible, and removes 636 residual jitters after most of the rotations are removed via steps 632 and 634. After generating the intermediate video that has all rotations, the raw rotations, removed from the input video data, the image processing system 200 reapplies 640 a smoothed version of raw rotations to the intermediate video to preserve some original rotations (e.g., overall camera forward direction change) included in the input video data that are desirable. The image processing system 200 generates 650 a 360-degree stabilized video (a stabilized version of the input video data).

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a 360-degree video data, the 360-degree video data comprising a plurality of video frames, the video frames comprising a plurality of key frames and a plurality of inner frames between consecutive pairs of key frames;
   tracking one or more feature points through the plurality of video frames, the tracked feature points forming visual feature point trajectories through the plurality of video frames;
   applying a hybrid stabilization model based on the feature point trajectories, wherein applying the hybrid stabilization model comprises:
      determining matching point pairs for each consecutive pair of key frames, the matching point pairs based on the tracked feature points;
      estimating rotations of a device capturing the 360-degree video data in a three dimensional image space of the determined key frames using three dimensional reasoning, the estimating based on the matching point pairs for the consecutive pairs of key frames; and
      optimizing one or more inner frames of the video using two dimensional reasoning, the optimizing based on the estimated rotations in a two dimensional image space of the determined key frames; and
   generating a stabilized 360-degree video data based on output of the hybrid stabilization model.

2. The method of claim 1, wherein each video frame of the 360-degree video data shows a circumferential view combining scenes visible from different single-view directions.

3. The method of claim 1, wherein the feature points are representative points in one or more video frames that are suitable for tracking.

4. The method of claim 1, wherein the determined key frames are selected video frames that are spaced to allow minimal error accumulation when estimating rotations of the determined key frames and maximal smoothness when optimizing the one or more inner frames.

5. The method of claim 1, wherein optimizing the inner frames further comprises:
undoing the relative rotations between the determined key frames by applying an inverse transformation; and
maximizing visual smoothness of the feature point trajectories in a two dimensional image space.

6. The method of claim 1, wherein applying the hybrid stabilization model further comprises:
removing residual jitters based on the estimated rotations of the determined key frames and the optimized inner frames.

7. The method of claim 1, wherein applying the hybrid stabilization model further comprises:
reapplying a smoothed version of the estimated rotations to the video, the smoothed version preserving original video orientation of the video.

8. The method of claim 1, further comprising:
applying a speed adjustment model for realizing constant speed of content change of the plurality of the video frames.

9. The method of claim 8, wherein applying the speed adjustment model further comprises:
adjusting the plurality of video frames by increasing video frames with less repetitive information and reducing video frames with more repetitive information.

10. A non-transitory computer-readable storage medium storing computer program instructions, the computer program instructions when executed by a computer processor causes the processor to perform steps of:
receiving a 360-degree video data, the 360-degree video data comprising a plurality of video frames, the video frames comprising a plurality of key frames and a plurality of inner frames between consecutive pairs of key frames;
tracking one or more feature points through the plurality of video frames, the tracked feature points forming visual feature point trajectories through the plurality of video frames;
applying a hybrid stabilization model based on the feature point trajectories, wherein applying the hybrid stabilization model comprises:
determining matching point pairs for each consecutive pair of key frames, the matching point pairs based on the tracked feature points;
estimating rotations of a device capturing the 360-degree video data in a three dimensional image space of the determined key frames using three dimensional reasoning, the estimating based on the matching point pairs for the consecutive pairs of key frames; and
optimizing one or more inner frames of the video using two dimensional reasoning, the optimizing based on the estimated rotations in a two dimensional image space of the determined key frames; and
generating a stabilized 360-degree video data based on output of the hybrid stabilization model.

11. The non-transitory computer-readable storage medium of claim 10, wherein each video frame of the 360-degree video data shows a circumferential view combining scenes visible from different single-view directions.

12. The non-transitory computer-readable storage medium of claim 10, wherein the feature points are representative points in one or more video frames that are suitable for tracking.

13. The non-transitory computer-readable storage medium of claim 10, wherein the determined key frames are selected video frames that are spaced to allow a determined amount of motion to occur between each pair of adjacent key frames.

14. The non-transitory computer-readable storage medium of claim 10, wherein optimizing the inner frames further comprises:
undoing the relative rotations between the determined key frames by applying an inverse transformation; and
maximizing visual smoothness of the feature point trajectories in a two dimensional image space.

15. The non-transitory computer-readable storage medium of claim 10, wherein applying the hybrid stabilization model further comprises:
removing residual jitters based on the estimated rotations of the determined key frames and the optimized inner frames.

16. The non-transitory computer-readable storage medium of claim 10, wherein applying the hybrid stabilization model further comprises:
reapplying a smoothed version of the estimated rotations to the video, the smoothed version preserving original video orientation of the video.

17. The non-transitory computer-readable storage medium of claim 10, further comprising:
applying a speed adjustment model for realizing constant speed of content change of the plurality of the video frames.

18. The non-transitory computer-readable storage medium of claim 17, wherein applying the speed adjustment model further comprises:
adjusting the plurality of video frames by increasing video frames with less repetitive information and reducing video frames with more repetitive information.

* * * * *